3 Sheets—Sheet 1.

T. F. McGOUGH.
Ditching-Machine.

No. 202,661. Patented April 23, 1878.

3 Sheets—Sheet 2.

T. F. McGOUGH.
Ditching-Machine.

No. 202,661. Patented April 23, 1878.

Witnesses
Fred G. Dietrich
E. C. Walford

Inventor
Thomas F. McGough
by La Fayette Bingham & Co.
attys

3 Sheets—Sheet 3.
T. F. McGOUGH.
Ditching-Machine.
No. 202,661. Patented April 23, 1878.
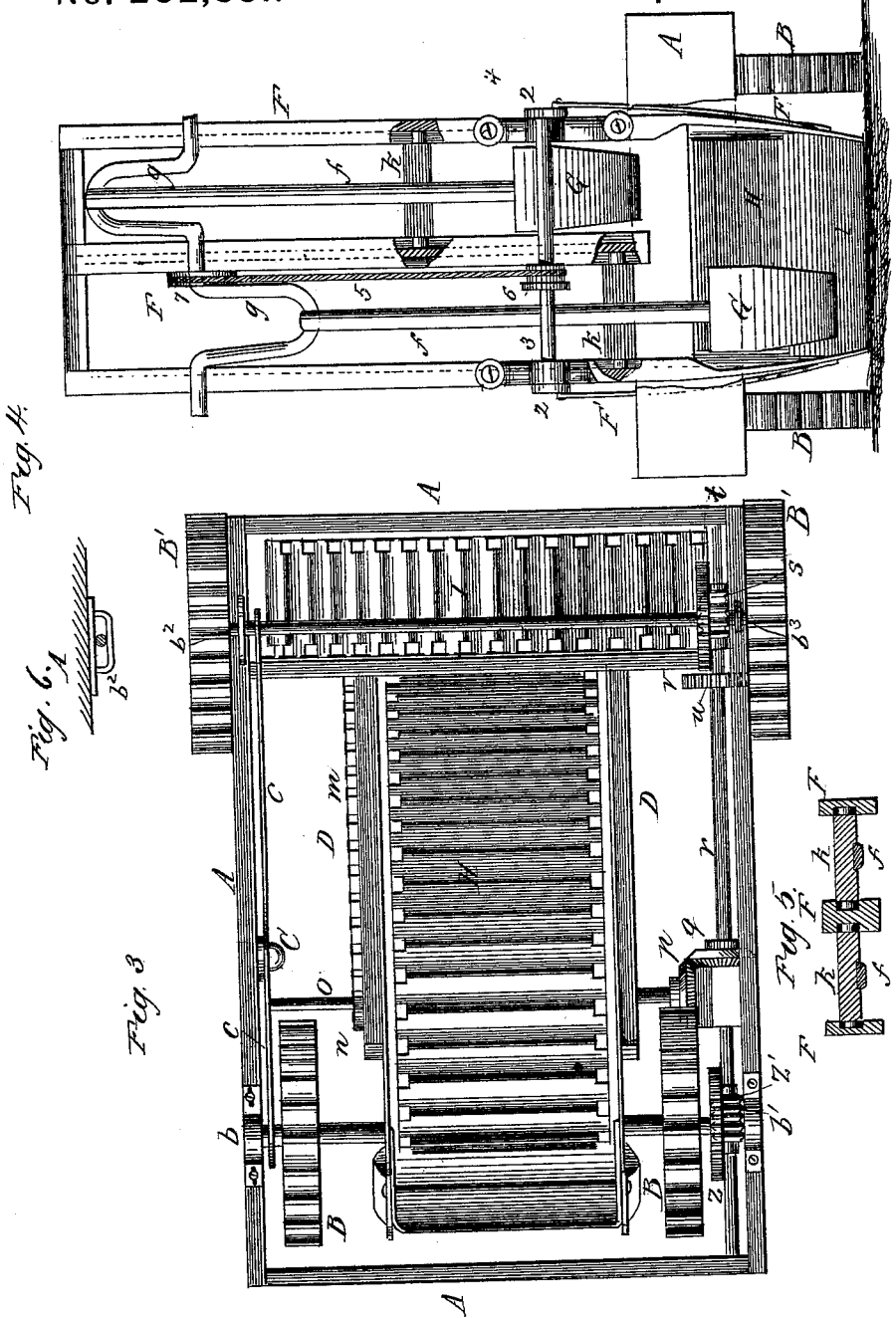

UNITED STATES PATENT OFFICE.

THOMAS F. McGOUGH, OF EAU CLAIRE, WISCONSIN.

IMPROVEMENT IN DITCHING-MACHINES.

Specification forming part of Letters Patent No. 202,661, dated April 23, 1878; application filed January 15, 1878.

*To all whom it may concern:*

Be it known that I, THOMAS FRANCIS MCGOUGH, of Eau Claire, in the county of Eau Claire and State of Wisconsin, have invented certain new and useful Improvements in Ditching-Machines; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1:
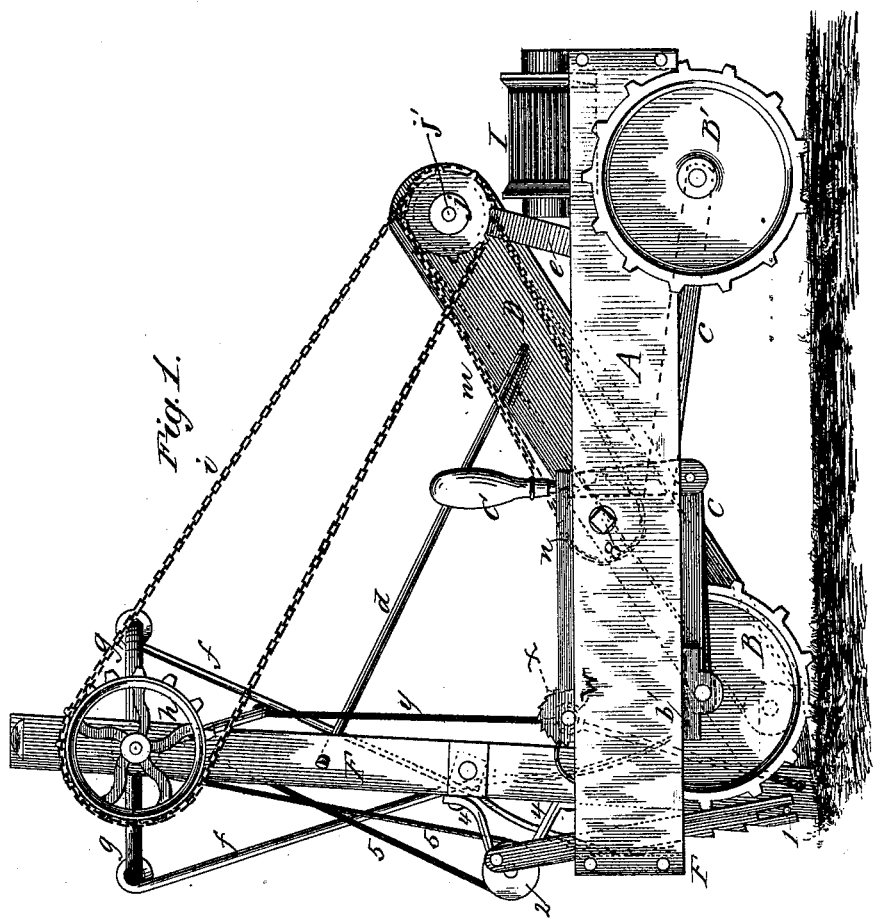
Figure 2:
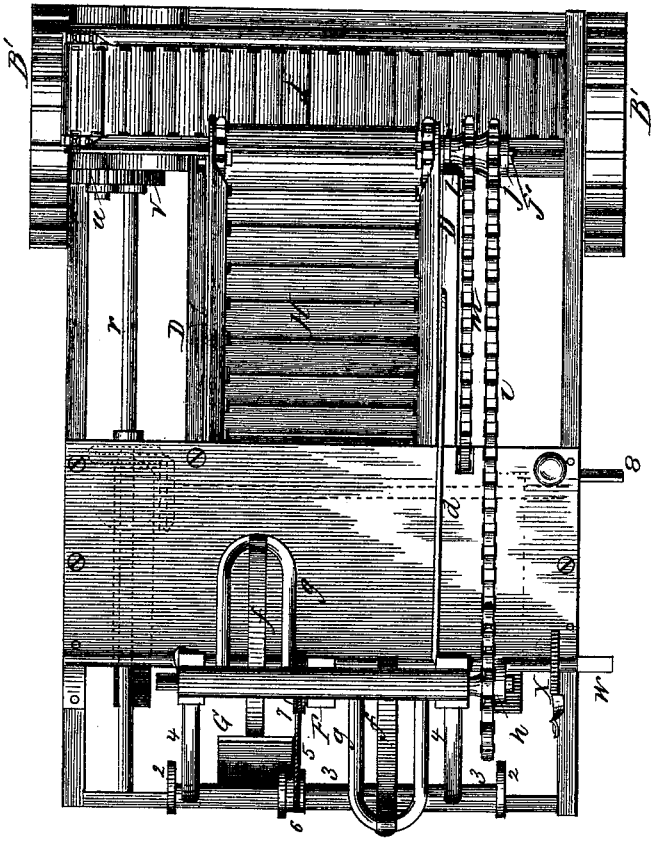

Figure 1, Sheet 1, is a side elevation of my improved ditching-machine. Fig. 2, Sheet 2, is a plan view of the same. Fig. 3, Sheet 3, is an inverted view, and Fig. 4 a front elevation thereof. Fig. 5 is a transverse horizontal section, taken through the trunnioned guide or cross-pieces of the spade handles or rods. Fig. 6 is a side view of rear axle-bearing on one side of the machine.

The same part in each figure is denoted by the same letter.

This invention appertains to certain improvements in ditching-machines; and it consists in so arranging two or more spades or other suitable cutting implements, with reference to the bottom cutter or excavator, as to strike and enter the ground in their downward stroke in advance of said bottom cutter, and, upon their return or ascending stroke or movement, to approach and remove the excavated dirt or earth from said cutter; secondly, in the employment of saw-tooth-shaped cutters, arranged to cut or trim the sides of the ditch; thirdly, in operating the aforesaid cutters so as to have a vertical sawing motion; and, finally, of certain details of construction, substantially as hereinafter more particularly set forth.

In the annexed drawing, A marks a horizontal frame of any suitable dimensions and shape, within which the parts of my machine are arranged. This frame is supported upon the transporting and driving wheels B B', the axles of which are connected—the forward one to said frame by bearings $b$ $b^1$, one being slotted, as seen in Fig. 3, where its fastening passes through it, and the rear one, preferably, by staple-like bearings $b^2$ $b^3$, one of which being sufficiently large to permit of the axle having a limited longitudinal movement, the purpose of which will be seen in connection with the devices which are to be immediately described.

C is a hand-lever, which is fulcrumed to the inside of the frame A, and connecting with the axles of the wheels B B' at those ends supported in the slotted and enlarged bearings by means of plates $c$ $c$, or other suitable connections. By moving the handle or lever C forward, the wheels on that side of the machine will be so effected as to cause the machine to move around a curve in turning the same.

Pivoted about centrally in the frame A, upon the uprights $e$ $e$, is an inclined support or covered frame, D, to the lower or forward end of which is fastened the bottom cutter or excavator E, of any preferred construction.

F is an upright frame, secured at its lower end to the sides of the cutter E, and held in position and connected to the upper end of the incline D by the rods or braces $d$ $d$. G G refer to spades or other suitable cutting-implements, the handles $f f$ of which are bent or inclined outwardly and connected to a crank-shaft, $g$, journaled in the frame F, and driven by a sprocket-wheel, $h$, and chain or belt $i$, passing around said wheel, and a similar wheel, $j$, upon a shaft, $j'$, to be referred to further hereinafter. The handles of the spades are provided with cross-pieces or guides $k$ $k$, trunnioned at their ends and fitting in vertical grooves in the frame F, as seen in Fig. 4, to guide the said handles and spades in their movement. By imparting motion to the spades it will be seen that, in their downward stroke, which is alternate, they strike and enter the ground in advance of the bottom cutter E, loosening the earth before it, and, as they begin to ascend, or upon their return movement, they approach and remove the excavated earth from said cutter, whence it is taken by an endless slotted elevator or apron, H, encompassing the incline D, and driven by rollers and a sprocket-wheel, $l$, and chain or belt $m$. The belt $m$ receives motion from and passes around a second similar wheel, $n$, upon a shaft, $o$, driven by the beveled gear-wheels $p$ $q$ and shaft $r$, having a screw or worm, $s$, gearing with a cog-wheel, $t$, upon one of the axles of the driving and transporting wheels B B'. The earth elevated by the apron H falls upon a second apron or conveyer, I, disposed at right angles to the apron H, and which discharges the earth to one side of the ditch. The apron or conveyer I encompasses two rollers with sprocket-wheels, which are driven by the pinion $u$, gearing with a pinion, $v$, upon the shaft $r$. In making trenches or ditches for the reception of tile the apron I may be dispensed with and a spout or trough used in its place, to conduct the excavated earth back into the ditch as the tile is being laid, to cover up the same.

A windlass arrangement, $w\ x$, connected by the ropes or chains $y$ to the upper and lower ends of the upright frame F, to which the bottom cutter E is attached, serves to permit the vertical adjustment of the said cutter in gaging the depth of the ditch to be cut.

Additional gear-wheel $z$ and worm or screw $z'$, attached, respectively, to the forward axle and shaft $r$, may be used to assist the driving-power of said shaft.

F' F' mark two saw-tooth-shaped cutters, disposed one to each side of the bottom cutter E, to cut or trim the sides of the ditch. The object of so shaping the cutters F' F' is to cause them to cut or saw roots that may be in the line of their path. The lower or slotted ends of these cutters are confined in position by means of headed projections or studs 1 1 projecting from the frame F into their slots, as seen in Fig. 1. Their upper ends are eccentrically connected to disks 2 2, or to cranks upon a shaft, 3, supported in brackets 4 4 secured to the frame F. Motion being imparted to the shaft 3 through a belt, 5, passing around a pulley, 6, thereon, and a pulley, 7, upon the crank-shaft $g$, operated as before mentioned, the toothed cutters F F' will receive a vertical or slightly forward sawing movement to enable them to do their work as above specified.

The application of the propelling power, which may consist of a two-horse-power upright engine, to the machine, is made at the point marked 8, Figs 1 and 2. Before starting the machine a hole or excavation, sufficiently large to sink the point of the bottom cutter E slightly below the surface of the ground, is made.

Having thus described my invention, what I claim, and desire to secure by Letters Patent, is—

1. In a ditching-machine, the combination, with its bottom cutter, of two or more cutting-implements arranged and operating to strike and cut the ground in advance of said bottom cutter, and as they return to approach and remove the excavated earth from said cutter to enable the dirt or earth to be elevated, substantially as set forth.

2. In combination with the bottom cutter E, the spades or cutting-implements G G, having the bent handles or rods $f\ f$ connected to the crank-shaft $g$, and guided in the frame F, substantially as and for the purpose set forth.

3. The saw-tooth-shaped side cutters F F', arranged and operating substantially as and for the purpose set forth.

4. The toothed-cutters F F', in combination with the eccentrics or cranks 2 2, shaft 3, belt 5, and crank-shaft $g$, substantially as and for the purpose set forth.

5. The combination of the bottom cutter E, having a dirt-elevator, spades or cutting-implements G G, having their handles connected to a crank-shaft driven by suitable mechanism, and side cutters F F', operated as set forth, substantially as and for the purpose specified.

6. The steering mechanism, consisting of the hand-lever C, connected to the axles of the wheels by the plates or connections $c\ c$, and said axles provided with slotted or enlarged bearings $b\ b^2$, substantially as shown and set forth.

In testimony that I claim the foregoing as my own I affix my signature in presence of two witnesses.

THOS. F. McGOUGH.

Witnesses:
S. W. McCoslin,
Vint W. James.